United States Patent
Miyashita (10) Patent No.: US 6,618,489 B1
(45) Date of Patent: Sep. 9, 2003

(54) APPARATUS AND METHOD FOR EMBEDDING INFORMATION IN AN IMAGE THROUGH REQUANTIZATION STEP WIDTH CONTROL

(75) Inventor: Tomoyuki Miyashita, Kodaira (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/585,610

(22) Filed: Jun. 2, 2000

(30) Foreign Application Priority Data

Jun. 18, 1999 (JP) .......................................... 11-173340

(51) Int. Cl.[7] ................................................ G06K 9/00
(52) U.S. Cl. ......................... 382/100; 382/251; 713/176
(58) Field of Search ................................ 382/100, 232, 382/251, 248, 249, 250; 380/210, 287, 252, 54; 713/176; 358/3.28

(56) References Cited

U.S. PATENT DOCUMENTS

| | | | | |
|---|---|---|---|---|
| 5,721,788 A | * | 2/1998 | Powell et al. ................ | 382/100 |
| 5,862,260 A | * | 1/1999 | Rhoads ......................... | 382/232 |
| 6,111,990 A | * | 8/2000 | Sugaya et al. ............... | 382/250 |
| 6,111,991 A | * | 8/2000 | Ribas-Corbera et al. .... | 382/251 |
| 6,175,639 B1 | * | 1/2001 | Satoh et al. ................. | 382/100 |
| 6,181,802 B1 | * | 1/2001 | Todd ............................ | 382/100 |
| 6,222,932 B1 | * | 4/2001 | Rao et al. .................... | 382/100 |
| 6,285,775 B1 | * | 9/2001 | Wu et al. ..................... | 382/100 |
| 6,453,053 B1 | * | 9/2002 | Wakasu ........................ | 382/100 |
| 6,473,516 B1 | * | 10/2002 | Kawaguchi et al. ......... | 382/100 |
| 2003/0035565 A1 | * | 2/2003 | Rhoads ......................... | 382/100 |

FOREIGN PATENT DOCUMENTS

JP      09247431 A  *  9/1997  .......... H04N/1/387

OTHER PUBLICATIONS

Cox et al, Secure spread spectrum watermarking for images, audio and video, Proceedings of the International Conference on Image Processing, Sep. 16–19, 1996, vol. 3, pp. 243–246.*

Kundur et al, Towards a telltale watermarking technique for tamper–proofing, Proceedings of the 1998 International Conference on Image Processing, Oct. 4–7, 1998, vol. 2, pp. 409–413.*

Inoue et al, A digital watermark method using the wavelet transform for video data, Proceedings of the 1999 IEEE International Symposium on Circuits and Systems, May 30–Jul. 02, 1999, vol. 4, pp. 247–250.*

Kundur et al, Digital watermarking for telltale tamper proofing and authentication, Proceedings of the IEEE, Jul. 1999, vol. 87, iss 7, pp. 1167–1180.*

* cited by examiner

*Primary Examiner*—Bhavesh M. Mehta
*Assistant Examiner*—Christopher Sukhaphadhana
(74) *Attorney, Agent, or Firm*—Fitzpatrick, Cella, Harper & Scinto (57) ABSTRACT

When information is embedded in image data by requantization, there is a trade-off relationship between a decline in image quality and resistance of the embedded information. Accordingly, the image characteristics in the vicinity of a pixel of interest in which information is to be embedded are determined and, on the basis of the result of determination, the requantization step width which prevails when the information is embedded in the pixel of interest is controlled.

16 Claims, 7 Drawing Sheets

| 180 | 120 | 70 |
|-----|-----|-----|
| 138 | 101 | 50 |
| 90  | 80  | 40 |

APPARATUS AND METHOD FOR EMBEDDING INFORMATION IN AN IMAGE THROUGH REQUANTIZATION STEP WIDTH CONTROL

FIELD OF THE INVENTION

This invention relates to an image processing apparatus and method and, more particularly, to an image processing apparatus and method for embedding prescribed information in image data.

BACKGROUND OF THE INVENTION

Various electronic watermark techniques have been developed in order to protect the copyright of digital content. According to one example of an electronic watermark technique, information relating to the handling of digital content (an example of such information being the name of the copyright holder or the ID of the purchaser) is embedded invisibly in the digital information of an image. A technique for providing security and protecting copyrights in electronic communications systems has become the focus of attention as means for tracing material such as illegal copies which infringe copyrights.

Various methods used in electronic watermark techniques to embed data have been proposed. One of these methods is to embed information in the least significant bit of the image data. This method embeds bit information in image data X (or in spatial-frequency data thereof). The value of the least significant bit (LSB) of the image data is changed in dependence upon whether the information of the one bit to be embedded is "0" or "1".

In a case where image data is "101", for example, the binary notation representing this data is "1100101". This binary notation will change to "1100100" if information "0" is embedded in this image data and to "1100101" if information "1" is embedded. Accordingly, the information that has been embedded is obtained by investigating the LSB of the image data.

Though this method is simple, information that has been embedded is lost when image data develops an error or when image data has been subjected to image processing. For example, even if only error information equivalent to one bit is added on, there is a direct effect upon embedded information. If a gamma conversion for grayscale processing of an image has been applied, the value of the LSB changes. In other words, even if watermark information has been embedded, it can be removed in a simple manner. In practical terms, therefore, this method is not entirely adequate in terms of resistance.

Figure 1:
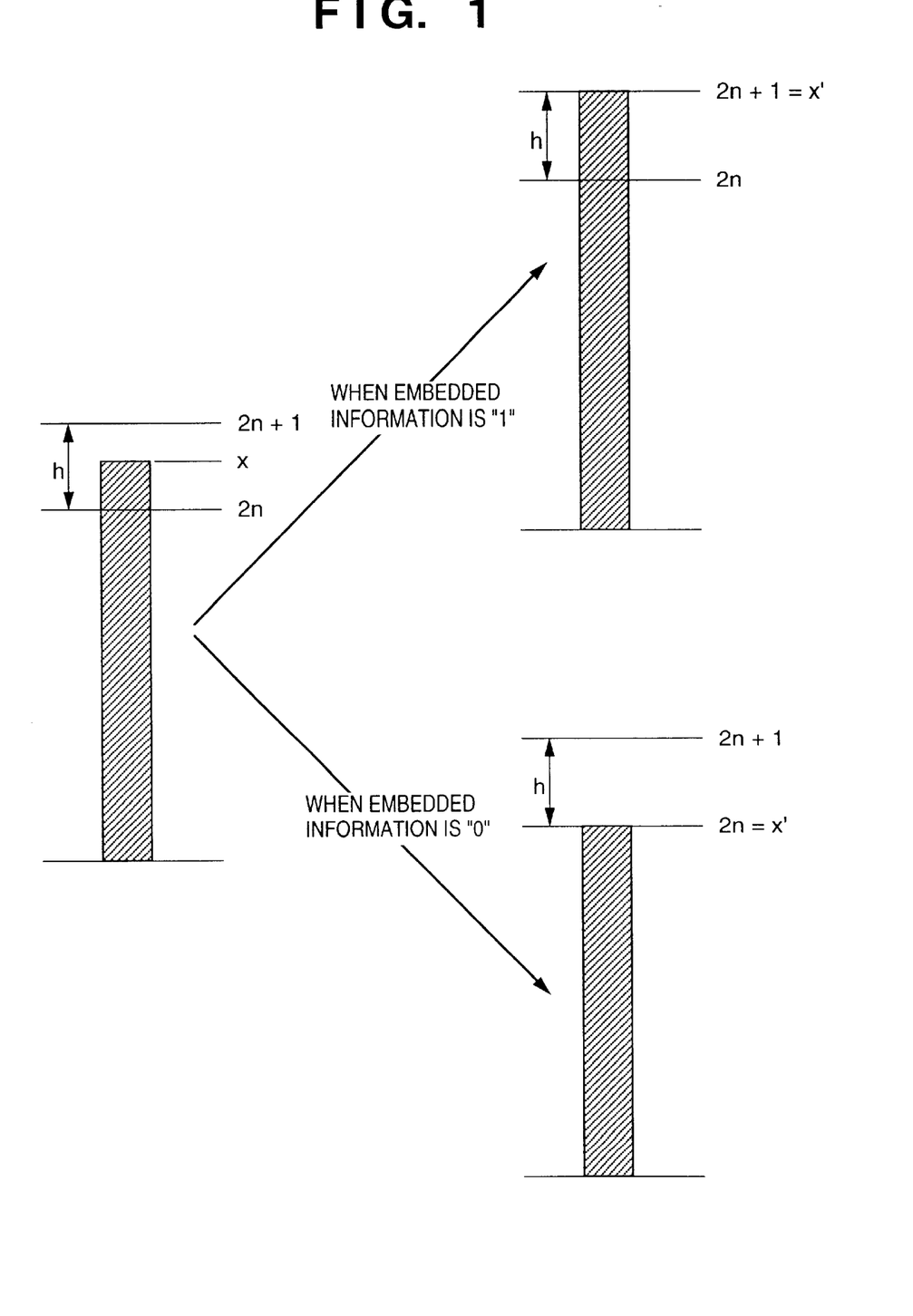
FIG. 1 is a diagram useful in describing requantization for embodiment information in image data.

A method of quantizing image data in order to strengthen resistance is proposed by the applicant. FIG. 1, which is a diagram useful in describing quantization, illustrates a method of quantizing image data of a designated location at a quantization step width h.

As shown in FIG. 1, the image data X is divided at the step h. If the step h is 4, the quantization values will be 4, 8, 12, 16, . . . , 100, 104, . . . If the image data is "101", the candidate for the quantization value will be "100" or "104". Accordingly, the following rule is established:

(1) when embedded information is "0", adopt the even-numbered quantization value; and (2) when embedded information is "1", adopt the odd-numbered quantization value.

Since the quantization value "100" is 4×25, this is odd-numbered, and since the quantization value "104" is 4×26, this is even-numbered. Accordingly, image data X having the value "101" is quantized to image data X' having the even-numbered value "104" when the embedded information is "0", and to image data X' having the odd-numbered value "100" when the embedded information is "1". Such quantization for embedding information is referred to as "requantization".

Information that has been embedded can be detected by dividing the requantized image data X' at the step h and following this rule:

(1) the embedded information is "1" if the quotient (X'/h) is an odd number; and (2) the embedded information is "0" if the quotient (X'/h) is an even number.

More specifically, since 100/4=25 is an odd number, the embedded information is "1", and since 104/4=26 is an even number, the embedded information is "0".

If the requantization step width h is enlarged, resistance to error rises. For example, if data develops one bit's worth of error, "100" becomes "101" or "99" and "104" becomes "105" or "103". Accordingly, the detection rule cited above is changed as follows:

(1) the embedded information is "1" if the quotient (X'/h) is an odd number after being rounded off; and (2) the embedded information is "0" if the quotient (X'/h) is an even number after being rounded off.

More specifically, since we have 101/4=25.25 and 99/4=24.75, "25" holds, and this is an odd value. The embedded information, therefore, becomes "1". Further, since we have 105/4=26.25 and 103/4=25.75, "26" holds, and this is an even value. The embedded information, therefore, becomes "0".

The requantization step width h can be used properly in conformity with the purpose of utilization as a parameter corresponding to the strength of resistance to error. The step width h is managed as key information because the same value is necessary when information is embedded and when it is detected.

In a case where information is embedded in image data by the above-described method, a decline in image quality becomes conspicuous, especially in flat portions of an image, and the requantization step width h cannot be enlarged. That is, when information is embedded in image data, there is a trade-off relationship between image quality and resistance as follows:

(1) if the requantization step width h is small, a decline in image quality does not occur but the resistance of the embedded information is low; and (2) if the requantization step width h is enlarged, the resistance of the embedded information rises but a decline in image quality of flat portions of the image becomes conspicuous.

SUMMARY OF THE INVENTION

Accordingly, an object of the present invention is to suppress a decline in image quality and improve the resistance of embedded information when information is embedded in image data.

According to a preferred embodiment of the present invention, the foregoing object is attained by providing an image processing apparatus comprising determination means for determining image characteristics in the vicinity of a pixel of interest in which information is to be embedded, and control means for controlling, on the basis of result of determination by the determination means, a requantization step width when information is embedded in the pixel of interest.

Further, according to a preferred embodiment of the present invention, the foregoing object is attained by providing an image processing apparatus comprising determination means for determining image characteristics of an image block containing a frequency component in which information is to be embedded, and control means for controlling, on the basis of result of determination by the determination means, a requantization step width when information is embedded in the frequency component.

Further, according to a preferred embodiment of the present invention, the foregoing object is attained by providing an image processing apparatus comprising determination means for determining image characteristics of an image block containing a frequency component in which information is to be embedded; and control means for controlling, on the basis of result of determination by said determination means, a requantization step width when information is embedded in the frequency component.

Further, according to a preferred embodiment of the present invention, the foregoing object is attained by providing an image processing apparatus comprising transformation means for dividing input image data into blocks of a prescribed size and performing an orthogonal transformation; determination means for determining image characteristics of the block based upon values of frequency components in the vicinity of a frequency component in which information is to be embedded; and embedding means for requantizing the frequency component by a step width that is based upon result of determination by the determination means, thereby embedding information.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

An image processing method according to embodiments of the present invention will be described in detail with reference to the drawings.

First Embodiment

Figure 2:
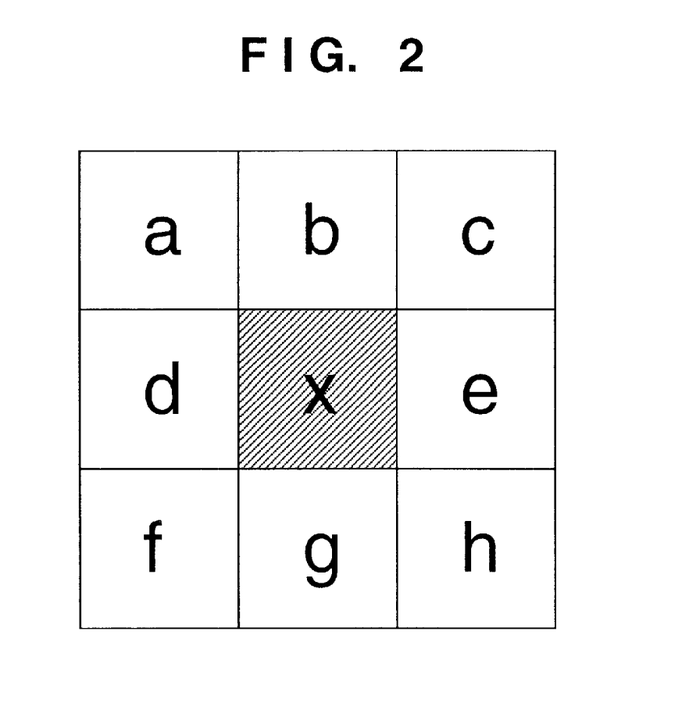
FIG. 2 is a diagram illustrating a state in which image data has been divided into a block of 3×3 pixels.

FIG. 2 is a diagram illustrating a state in which image data has been divided into a block of 3×3 pixels. In order to decide a requantization step width h with regard to a pixel X (referred to as a "pixel of interest" below) in which information is to be embedded, the values of eight pixels a, b, c, d, e, f, g and h (referred to as a "determination area" below) surrounding the pixel X of interest are utilized. Specifically, the requantization step width h is decided in accordance with the following rule:

(1) if the determination area indicates an edge, the requantization step width h is enlarged; and (2) if the determination area indicates a flat portion, the requantization step width h is reduced.

The determination as to whether the characteristic of a block is indicative of a edge or flat portion of an image will be described in detail later. For now suffice it to say that the method includes finding the slope (a quantity indicative of the image edge) of pixel values between neighboring pixels in the determination area, deciding that the portion of the image is an edge if this value of the slope is greater than a threshold value, and deciding that the portion of the image is a flat portion if the value of the slope is not larger than the threshold value.

Thus, if the requantization step width h is enlarged at the edge of an image, the resistance of the information-embedded area can be raised. Furthermore, even if the requantization step width h is small, it is possible to increase the number of pixels into which information may be embedded by embedding information even in the flat portion of an image. By performing the same determination and selecting the requantization step width h also at detection of embedded information, a decline in the image quality of the flat portion of the image can be suppressed and it is possible to detect the embedded information accurately. It should be noted that the method of dividing the image data is not limited to division into blocks of 3×3 pixels; it goes without saying that image data may be divided into blocks of 5×5 pixels or blocks of 7×7 pixels.

When embedded information is detected, however, there are cases where an error develops in the determination of the block characteristic owing to noise or image processing, as a result of which the correct requantization step width h cannot be selected. As a consequence, instances arise in which the embedded information either cannot be detected or cannot be detected correctly. In the first embodiment, this problem is solved through the method set forth below.

Figure 3:
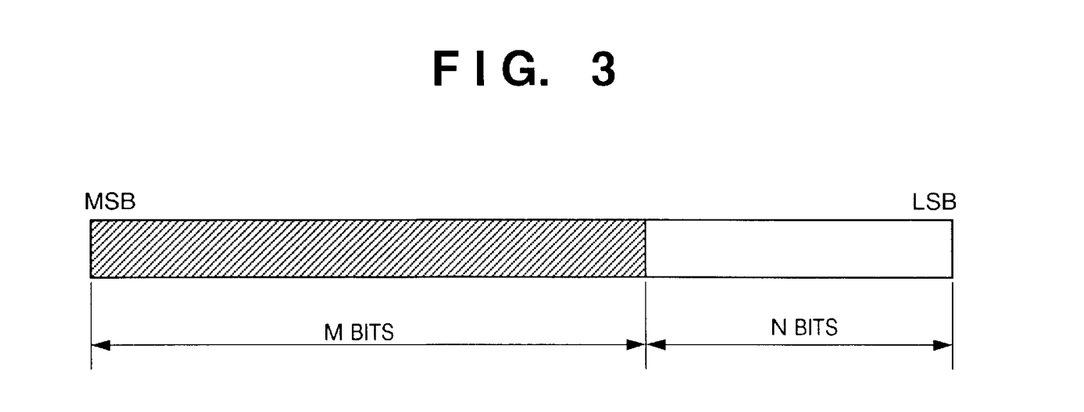
FIG. 3 is a diagram bit allocation of image data in a determination area.

FIG. 3 is a diagram illustrating bit allocation of image data in the determination area. In the case of 8-bit grayscale image data, for example, eight bits are divided into M higher order bits and N lower order bits (M+N=8), the N lower order bits are discarded and the M higher order bits are used in the determination. In other words, the determination is carried out upon quantizing the 8-bit image data for determination to M-bit image data, and the image data is requantized at the N-bit step width. In general, therefore, resistance is improved.

Figure 4:
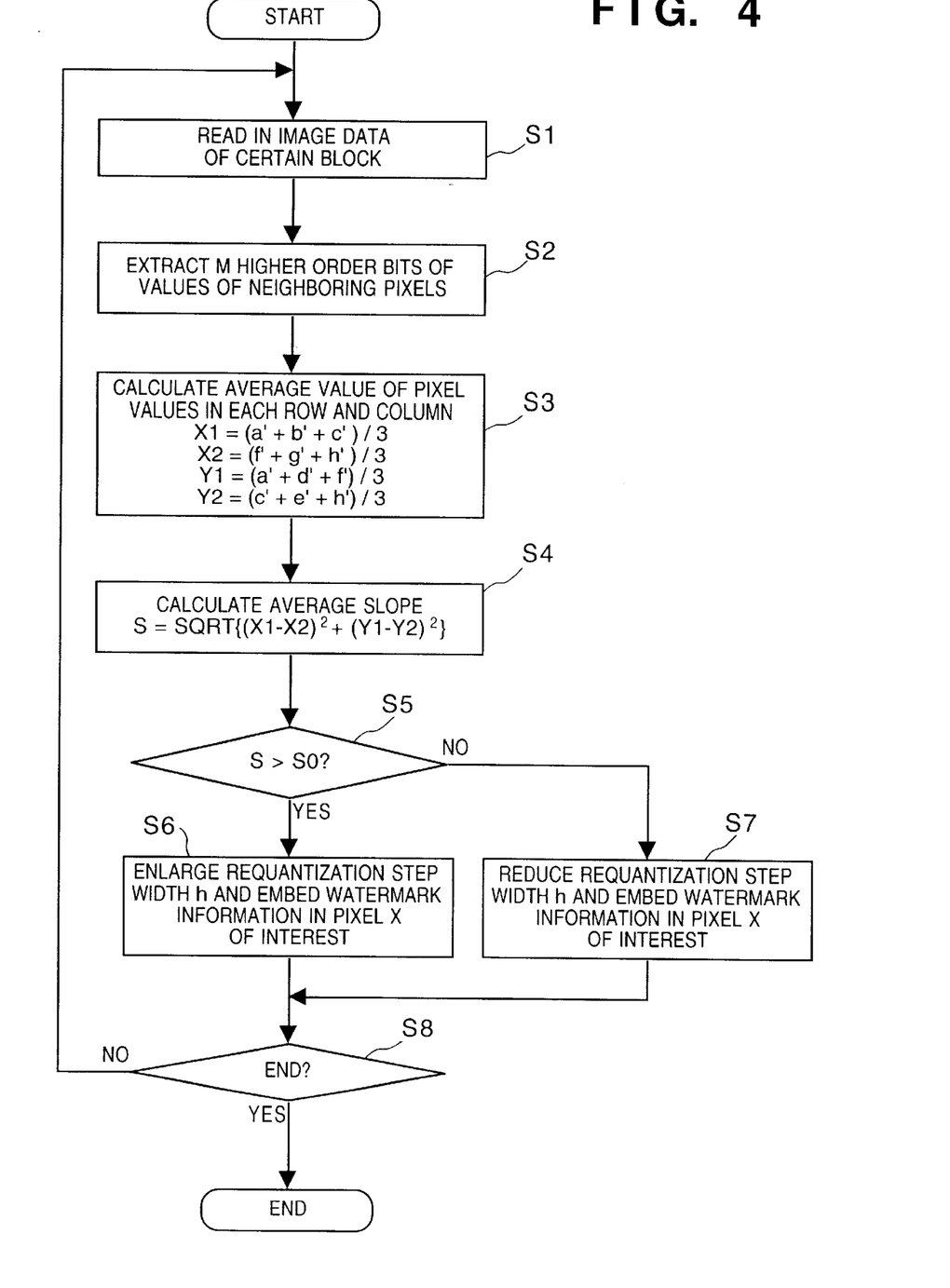
FIG. 4 is a flowchart illustrating processing for embedding information in image data.
Figure 5:
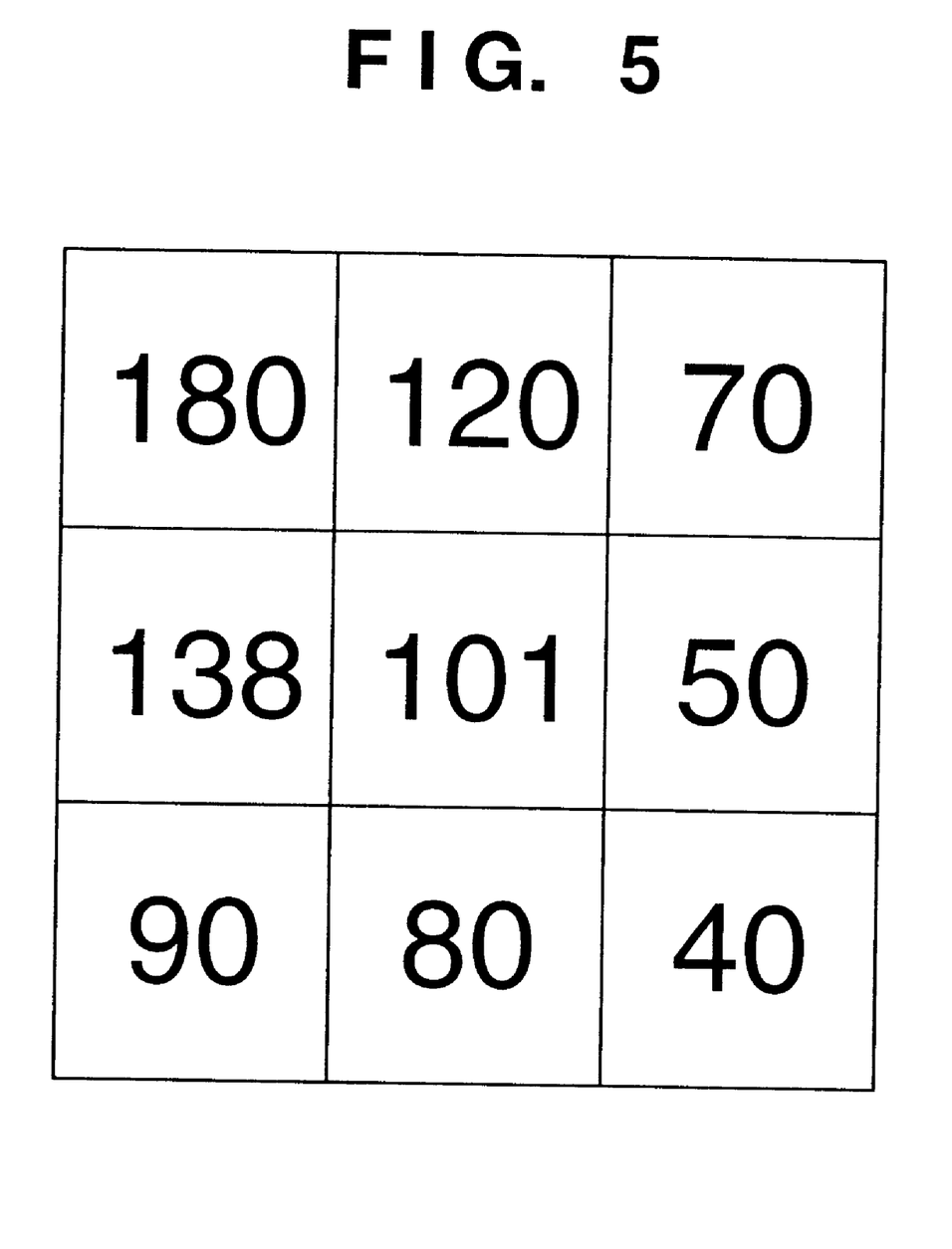
FIG. 5 is a diagram illustrating an example of image data in a block in which information is embedded.

A case in which information is embedded in image data of a block of the kind shown in FIG. 5 will be described in detail with reference to the flowchart of FIG. 4.

First, the pixel X of interest of a certain block and the values of the neighboring pixels are read in (S1). If the values of the neighboring pixels are as shown in FIG. 5, these are expressed as follows in terms of binary notation:

$$a=180=\text{``10110100''}, b=120=\text{``01111000''}$$

$c=70=$"01000110", $d=138=$"10001010"

$e=50=$"00110010", $f=90=$"01011010"

$g=80=$"01010000", $h=40=$"00101000"

When the four higher order bits of the neighboring pixel values are extracted, the following is obtained (S2):

$a'=$"1011"=11, $b'=$"0111"=7

$c'=$"0100"=4, $d'=$"1000"=8

$e'=$"0011"=3, $f'=$"0101"=5

$g'=$"0101"=5, $h'=$"0010"=2

Whether the portion of the image under scrutiny is an edge is determined using the four higher order bits. First, the average values of the pixel values in the X and Y directions (the row and column directions) are calculated (S3).

$X1=(a'+b'+c')/3=7.33$ $X2=(f'+g'+h')/3=4.0$ $Y1=(a'+d'+f')/3=8.0$ $Y2=(c'+e'+h')/3=3.0$

Average slope S is calculated from the average values that have been obtained (S4).

$S=\sqrt{\{(X1-X2)^2+(Y1-Y2)^2\}}=6.01$

The average slope S thus obtained and a threshold value S0 are compared (S5). If the threshold value S0 is set to "3", X>S0 will hold and therefore it is judged that the processed block is the edge of the image. It should be noted that the threshold value S0 is a strength parameter that corresponds to the resistance of the determination. If this value is made large, the resistance to error can be raised.

The pixel X of interest, which has the value "101", is requantized at a requantization step width h=8 (S6), for example, based upon the determination made at step S5. Accordingly, this is requantized to the even-numbered "104" when the embedded information is "0" and to the odd-numbered "100" when the embedded information is "1".

Figure 6:
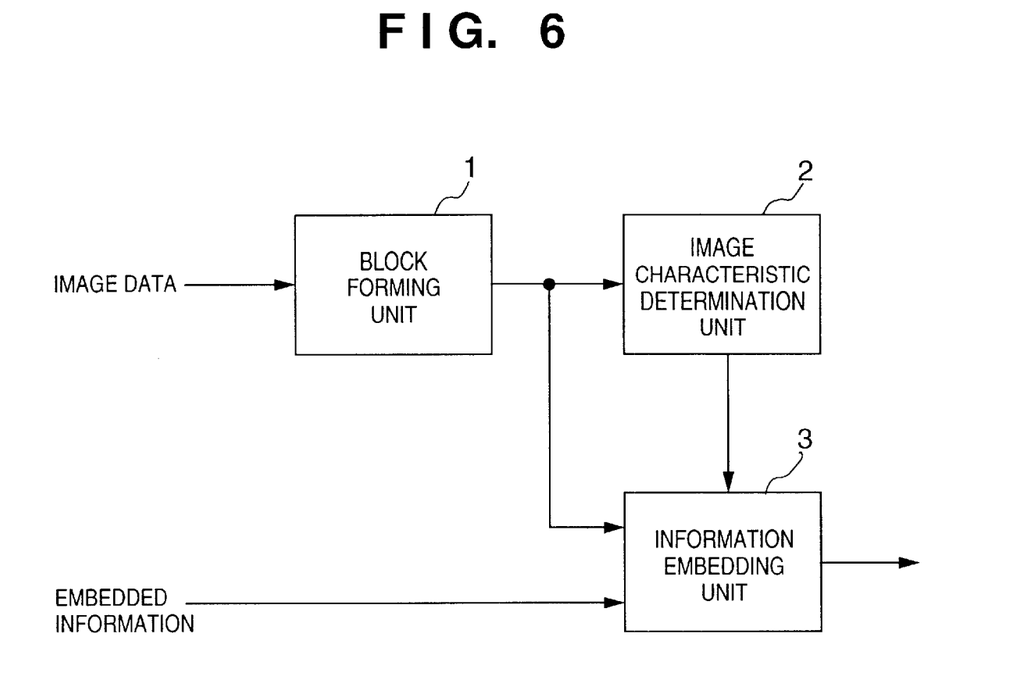
FIG. 6 is a block diagram illustrating the construction of an image processing apparatus according to a first embodiment.

FIG. 6 is a block diagram showing the construction of an image processing apparatus according to this embodiment.

Image data in which information is to be embedded is divided into a block of, e.g., 3×3 pixels by a block forming unit 1. An image characteristic determination unit 2 determines the image characteristic of the block from the neighboring pixels. An information embedding unit 3 decides the requantization step width h based upon the result of the determination and embeds information in the pixel X of interest.

Though the details are not described, block characteristics are judged by a method similar to the foregoing also when embedded information is detected, whereby it is possible to select (decide) the step width h that was used in the requantization of the block.

In the example described above, one threshold value is adopted and two requantization step width values are used. However, it is also possible to set a plurality of threshold values and vary the step width over multiple stages. If this arrangement is adopted, it is possible to control the extent of requantization finely in dependence upon the image characteristics in the vicinity of the pixel in which the information is embedded. As a result, a decline in image quality can be suppressed.

Thus, the characteristics of an image area are judged from the pixels neighboring a pixel in which information is to be embedded. If the characteristics are indicative of a pixel at an edge (an area in which there is little decline in image quality due to embedding of information), requantization is performed at a comparatively large requantization step width. If the characteristics are indicative of a pixel in a flat portion (an area in which there is a large decline in image quality due to embedding of information), requantization is performed at a comparatively small requantization step width. By performing such adaptive control of the requantization step width, a decline in image quality is suppressed and it is possible to raise the resistance of information (an electronic watermark, etc.) that has been embedded in an image.

Furthermore, since the above-described determination of the characteristics of an image is performed using the M higher order bits of neighboring pixels, embedding of information having higher resistance to noise and image processing is realized.

Further, since the features of an image are extracted and the embedding of information is carried out in accordance with these features, it is no longer necessary to deliver position information, in which information has been embedded, together with image data having embedded information.

Second Embodiment

According to a second embodiment, embedded information is provided with redundancy to suppress the effects of noise and image processing on the detection of the embedded information. More specifically, in a case where the information to be embedded is "1", a "111" bit array, in which "1" is repeated three times, is embedded.

For example, assume that as the result of noise or image processing, "101" has been detected for a block in which "111" should have been detected. If the detected "101" is mistaken for "111", the number of erroneous bits will be one. If the detected "101" is mistaken for "000", on the other hand, the number of erroneous bits will be two. Accordingly, the detected "101" is corrected to "111" for which the number of erroneous bits is the smaller.

Third Embodiment

Described next will be a method of embedding information in spatial-frequency data obtained by subjecting image data to a DCT (Direct Cosine Transformation).

DCT is a transformation method utilized in the JPEG scheme, which is a standard method of compressing a still picture, and in the MPEG scheme, which is a standard method of compressing a moving picture. DCT is applied to a block of 8×8 pixels to obtain spatial-frequency data having 8×8 transformation coefficients of the kind shown in FIG. 7. In a case where DCT is utilized in an electronic watermark, information is embedded in this spatial-frequency data.

Figure 7:
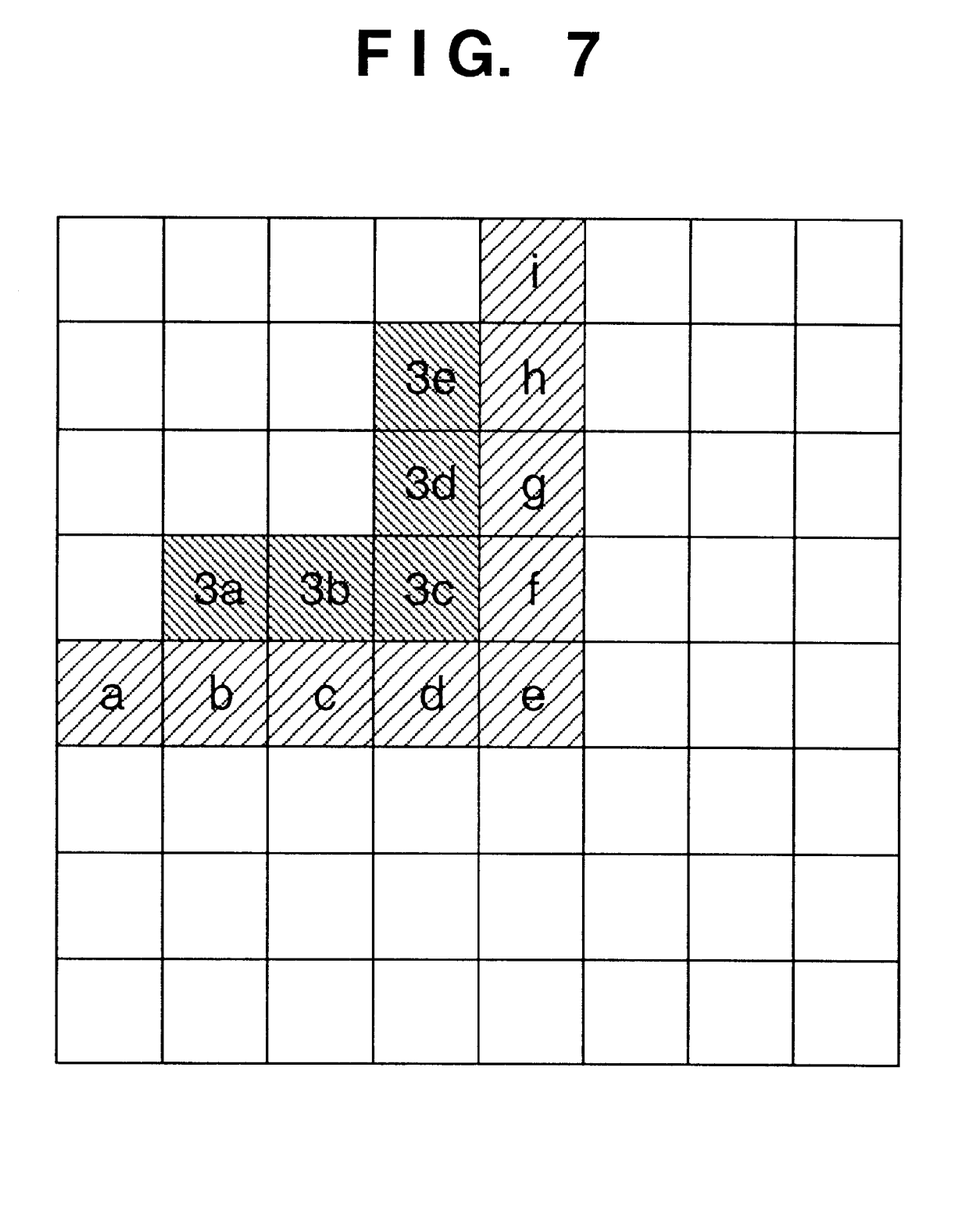
FIG. 7 is a diagram useful in describing spatial-frequency data obtained by DCT.

As shown in FIG. 7, the coefficient at the upper-left corner represents the DC component, and the farther to the right or the farther downward the coefficient, the higher the spatial frequency. With the JPEG scheme, in which use is made of the fact that the high frequency components of an image tend to decrease monotonously, all transformation coefficients having small values are made zero to raise the compression rate. Consequently, when it is attempted to embed information in a high-frequency component, almost all of the data becomes zero and there are cases where information cannot be embedded. Accordingly, information is embedded in the mid-range spatial-frequency components indicated at 3*a*, 3*b*, 3*c*, 3*d* and 3*e* in FIG. 7. Further, it is determined whether the particular block has an image edge based upon frequency components in the vicinity of frequency components in which information is embedded, and the requantization step width is controlled on the basis of the result of this determination.

Figure 8:
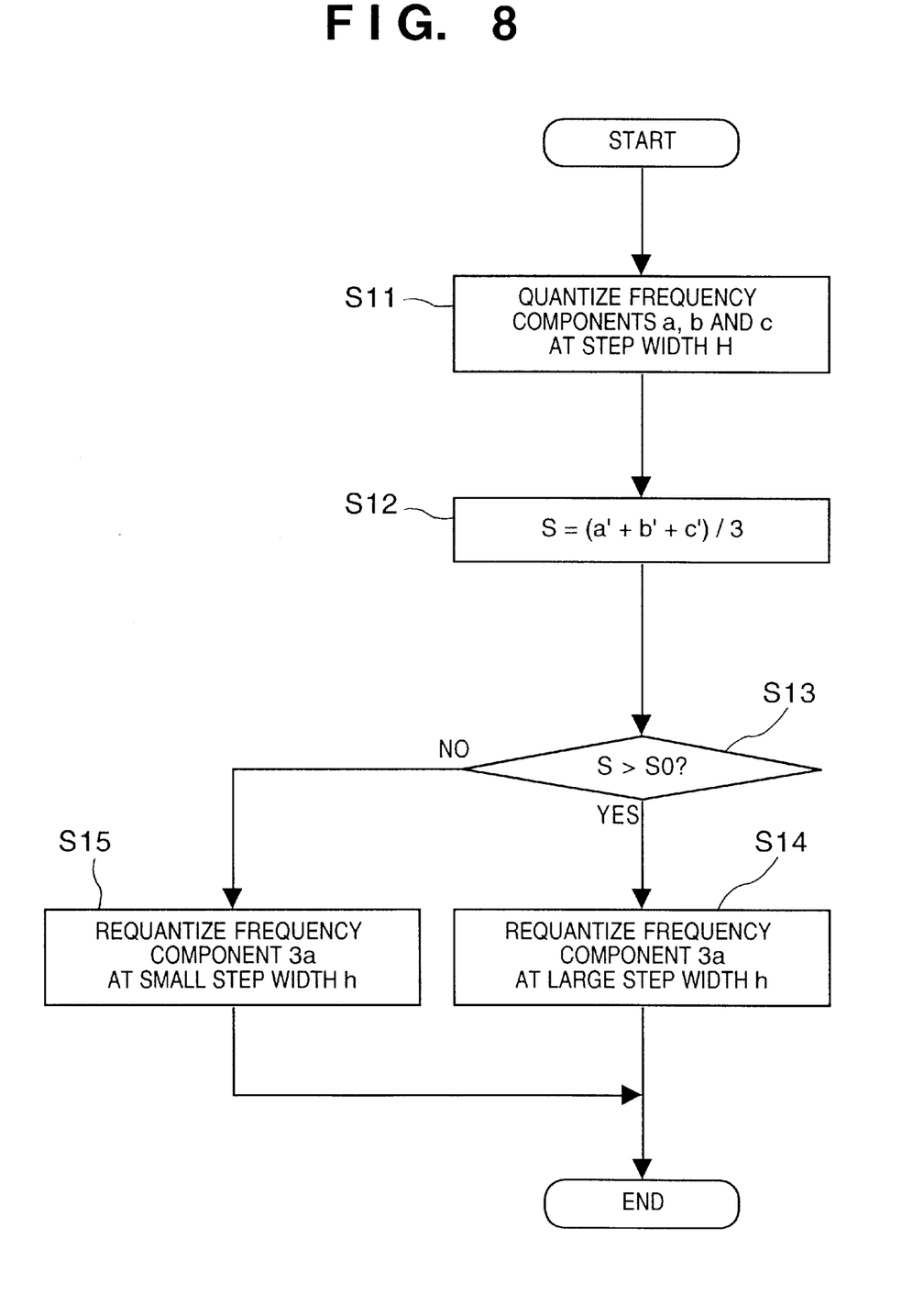
FIG. 8 is a flowchart useful in describing a method of embedding information in a certain frequency component.

Reference will be had to the flowchart of FIG. 8 to describe a method in which it is determined whether a block has an edge based upon the values of a set of certain frequency components, and information is embedded in a certain frequency component in accordance with the result of this determination.

First, the value of frequency components a, b and c are quantized at a quantization step width H at step S11. That is, there are obtained absolute values a', b' and c', which are the result of discarding the decimal fractions of a/H, b/H and c/H. Next, the average value S=(a'+b'+c')/3 of the values a', b' and c' is obtained at step S12. The average value S and the threshold value S0 are compared at step S13 and, if S>S0 holds, the frequency component 3*a* is requantized at step S14 based upon a large step width h and the embedded information. If S≦S0 holds, on the other hand, the frequency component 3*a* is requantized at step S15 based upon a small step width h and the embedded information.

Assume that the values of the frequency components of a certain block are "120", "−89" and "95". If the requantization step width H is "6", then we have a'=20, b'=14 and c'=15, and the average value S becomes equal to 16.33. If threshold value S0=15 holds, then this block will be judged to have an edge and the frequency component 3*a* will be requantized at a large step width h, e.g., "8". If average value S=14 holds, then this block will be judged to be a flat portion and the frequency component 3*a* will be requantized at a small step width h, e.g., "4" or "12".

Similar determination processing is applied to another set of frequency components, e.g., (b, c, d) and another frequency component 3*b* is requantized. Similar processing is applied further to the sets of frequency components (c, d, e), (f, g, h) and (g, h, i) and the corresponding frequency components 3*c*, 3*d* and 3*d* are requantized. By means of the operation described above, at least five bits of information can be embedded in one block.

It should be noted that the combinations of frequency components for determining image characteristics and the frequency components in which information corresponding to these combinations is embedded are not limited to those described above and illustrated in FIG. 7.

Thus, the characteristics of a block are judged from frequency components in the vicinity of frequency components in which information is embedded. In case of a block containing an edge (an area in which a decline in image quality due to embedding of information is small), requantization is performed at a comparatively large step width. In case of a block of a flat portion (an area in which a decline in image quality due to embedding of information is large), requantization is performed at a comparatively small step width. By performing such adaptive control of the requantization step width, a decline in image quality is suppressed and it is possible to raise the resistance of information (an electronic watermark, etc.) that has been embedded in an image.

Further, since the features of an image are extracted and the embedding of information is carried out in accordance with these features, it is no longer necessary to deliver position information, in which information has been embedded, together with image data having embedded information.

In accordance with each of the embodiments described above, it is possible to provide an image processing apparatus and method in which a decline in image quality is suppressed and the resistance of embedded information is raised when information is embedded in image data.

It goes without saying that the object of the invention is attained also by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes. In this case, the program codes read from the storage medium implement the novel functions of the embodiments, and the storage medium storing the program codes constitutes the invention.

Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
determination means for determining image characteristics in the vicinity of a pixel of interest in which information is to be embedded; and
control means for controlling, on the basis of result of determination by said determination means, a requantization step width when information is embedded in the pixel of interest.

2. The apparatus according to claim 1, wherein said determination means determines the image characteristics based upon values of pixels in the vicinity of the pixel of interest.

3. The apparatus according to claim 1, wherein said determination means determines the image characteristics based upon higher order bits of pixels in the vicinity of the pixel of interest.

4. An image processing method comprising the steps of:
determining image characteristics in the vicinity of a pixel of interest in which information is to be embedded; and
controlling, on the basis of result of determination, a requantization step width when information is embedded in the pixel of interest.

5. An image processing apparatus comprising:
dividing means for dividing input image data into blocks of a prescribed size containing a pixel of interest in which information is to be embedded;
determination means for determining image characteristics of the block based upon values of pixels in the vicinity of the pixel of interest; and embedding means for requantizing the pixel of interest by a step width that is based upon result of determination by said determination means, thereby embedding information.

6. The apparatus according to claim 5, wherein said determination means determines the image characteristics based upon higher order bits of pixels in the vicinity of the pixel of interest.

7. An image processing method comprising the steps of:
dividing input image data into blocks of a prescribed size containing a pixel of interest in which information is to be embedded;
determining image characteristics of the block based upon values of pixels in the vicinity of the pixel of interest; and
requantizing the pixel of interest by a step width that is based upon result of determination, thereby embedding information.

8. An image processing apparatus comprising:
determination means for determining image characteristics of an image block containing a frequency component in which information is to be embedded; and
control means for controlling, on the basis of result of determination by said determination means, a requantization step width when information is embedded in the frequency component.

9. The apparatus according to claim 8, wherein said determination means determines the image characteristics based upon values of frequency components in the vicinity of the frequency component in which the information is to be embedded.

10. An image processing method comprising the steps of:
determining image characteristics of an image block containing a frequency component in which information is to be embedded; and
controlling, on the basis of result of determination, a requantization step width when information is embedded in the frequency component.

11. An image processing apparatus comprising:
transformation means for dividing input image data into a blocks of a prescribed size and performing an orthogonal transformation;
determination means for determining image characteristics of the block based upon values of frequency components in the vicinity of a frequency component in which information is to be embedded; and
embedding means for requantizing the frequency component by a step width that is based upon result of determination by said determination means, thereby embedding information.

12. An image processing method comprising the steps of:
dividing input image data into a blocks of a prescribed size and performing an orthogonal transformation;
determining image characteristics of the block based upon values of frequency components in the vicinity of a frequency component in which information is to be embedded; and
requantizing the frequency component by a step width that is based upon result of determination, thereby embedding information.

13. A computer program product comprising a computer-readable medium having program code for image processing, said product comprising:
determination-process procedure code for determining image characteristics in the vicinity of a pixel of interest in which information is to be embedded; and
control-process procedure code for controlling, on the basis of result of determination, a requantization step width when information is embedded in the pixel of interest.

14. A computer program product comprising a computer-readable medium having program code for image processing, said product comprising:
dividing-processing procedure code for dividing input image data into blocks of a prescribed size containing a pixel of interest in which information is to be embedded;
determination-process procedure code for determining image characteristics of the block based upon values of pixels in the vicinity of the pixel of interest; and
control-process procedure code for requantizing the pixel of interest by a step width that is based upon result of determination, thereby embedding information.

15. A computer program product comprising a computer-readable medium having program code for image processing, said product comprising:
determination-process procedure code for determining image characteristics of an image block containing a frequency component in which information is to be embedded; and
control-process procedure code for controlling, on the basis of result of determination, a requantization step width when information is embedded in the frequency component.

16. A computer program product comprising a computer-readable medium having program code for image processing, said product comprising:
transformation-process procedure code for dividing input image data into a blocks of a prescribed size and performing an orthogonal transformation;
determination-process procedure code for determining image characteristics of the block based upon values of frequency components in the vicinity of a frequency component in which information is to be embedded; and
embedding-process procedure code for requantizing the frequency component by a step width that is based upon result of determination, thereby embedding information.

* * * * *

UNITED STATES PATENT AND TRADEMARK OFFICE
CERTIFICATE OF CORRECTION

PATENT NO. : 6,618,489 B1  
DATED : September 9, 2003  
INVENTOR(S) : Tomoyuki Miyashita It is certified that error appears in the above-identified patent and that said Letters Patent is hereby corrected as shown below:

<u>Title page,</u>
Item [56], FOREIGN PATENT DOCUMENTS, "09247431" should read
-- 09-24731 --.
OTHER PUBLICATIONS, "tamper proof-" should read -- tamper-proof- --; and "iss" should read -- iss. --.

<u>Column 1,</u>
Line 30, "in" should be deleted; and
Line 31, "dependence" should read -- depending --.

<u>Column 4,</u>
Line 10, "rule:" should read -- rules: --; and
Line 17, "a" should read -- an --.

<u>Column 5,</u>
Line 64, "in dependence" should read -- depending --.

<u>Column 7,</u>
Line 39, "3d and 3d" should read -- 3d and 3e --.

<u>Column 9,</u>
Line 41, "a" should be deleted.
Line 54, "a" (first occurrence) should be deleted.

<u>Column 10,</u>
Line 45, "a" (first occurrence) should be deleted.

Signed and Sealed this

Thirteenth Day of January, 2004

JON W. DUDAS
*Acting Director of the United States Patent and Trademark Office*

UNITED STATES PATENT AND TRADEMARK OFFICE
CERTIFICATE OF CORRECTION

PATENT NO.     : 6,618,489 B1
DATED          : September 9, 2003
INVENTOR(S)    : Miyashita It is certified that error appears in the above-identified patent and that said Letters Patent is hereby corrected as shown below:

Title page,
Item [*] Notice, "0 days" should read -- 586 days --.

Signed and Sealed this

First Day of November, 2005

JON W. DUDAS
*Director of the United States Patent and Trademark Office*